United States Patent
Milewski et al.

(10) Patent No.: US 6,878,430 B2
(45) Date of Patent: Apr. 12, 2005

(54) FLOOR COVERING OF AN ELASTICALLY DEFORMABLE MATERIAL

(76) Inventors: Wolfgang Milewski, Im Altengrund 14, D-97475 Zeil am Main (DE); Simon Hafenecker, Am Mardersberg 18, D-96126 Hafenpreppach (DE)

(*) Notice: Subject to any disclaimer, the term of this patent is extended or adjusted under 35 U.S.C. 154(b) by 5 days.

(21) Appl. No.: 09/745,645

(22) Filed: Dec. 22, 2000

(65) Prior Publication Data

US 2001/0021435 A1 Sep. 13, 2001

(30) Foreign Application Priority Data

Dec. 23, 1999 (EP) .............................. 99125727

(51) Int. Cl.$^7$ .......................... B32B 3/10; E04F 11/16; E04F 15/00; E01C 5/00; E01C 5/16
(52) U.S. Cl. ................... 428/131; 428/141; 52/177; 52/180; 15/215; 404/35; 404/34; 404/42; D6/582; D6/583; D6/584; D6/585; D6/586; D6/587; D6/588; D6/589; D6/590; D6/591; D6/592; D6/593; D6/594
(58) Field of Search ................. 428/131; 52/177, 52/180; 15/215; 404/35, 34, 42; D6/582–594

(56) References Cited

U.S. PATENT DOCUMENTS

| | | | | |
|---|---|---|---|---|
| 348,782 A | * | 9/1886 | Sawyer | 52/177 |
| 2,052,605 A | * | 9/1936 | Clark et al. | 428/72 |
| 2,326,963 A | * | 8/1943 | Morton | 52/180 |
| 2,810,672 A | * | 10/1957 | Taylor | 428/167 |
| 3,699,926 A | * | 10/1972 | Stockl | 119/28 |
| 4,329,981 A | * | 5/1982 | Dungl | 128/25 B |
| 4,478,901 A | * | 10/1984 | Dickens et al. | 404/36 |
| 5,619,832 A | * | 4/1997 | Myrvold | 52/403.1 |

FOREIGN PATENT DOCUMENTS

| | | |
|---|---|---|
| DE | 8632856 | 2/1987 |
| DK | 01070603 | 11/1995 |
| FR | 1384544 | 11/1969 |
| SE | 0104758 | 6/1992 |
| WO | 9506780 | 3/1995 |
| WO | 9620627 | 7/1996 |

* cited by examiner

*Primary Examiner*—Harold Pyon
*Assistant Examiner*—Patricia L. Nordmeyer
(74) *Attorney, Agent, or Firm*—Sidley Austin Brown & Wood, LLP

(57) ABSTRACT

A floor covering (1) made of an elastically moldable material, in particular from a synthetic rubber, which is provided with a regular arrangement consisting of first projections (3) on the upper side (1a) and with a regular arrangement of second projections (5) on the underside (1b), the projections of the first projections and of the second projections not exhibiting any overlapping area on the plane of the covering and that, on the underside within the projections of the first projections, third projections (7) are provided in each case which have a smaller height vis-à-vis the second projections such that the floor covering only touches a floor with the second projections when it is in an unloaded state, however, when a preset load is exceeded locally, the third projections come in contact with the floor.

13 Claims, 2 Drawing Sheets

FLOOR COVERING OF AN ELASTICALLY DEFORMABLE MATERIAL

BACKGROUND OF THE INVENTION

1. Field of the Invention

The invention concerns a floor covering made of an elastically moldable material, in particular from a synthetic rubber, in accordance with the preamble of claim 1.

2. Description of the Prior Art

Floor coverings of this type are known in various configurations and in practical use.

Thus, a floor covering of the generic type is known from each of CH-A-419 547 or DK-B-170 603. According to these publications, the floor covering has a regular arrangement of elevations on the upper side and the underside, respectively, whose projections do not overlap one another, but are spaced slightly from one another.

In these arrangements, considerable tensile stresses occur in the relatively thin area of the spaces between the projections on the top side and those on the underside when subjected to strong compressive loads, since, due to the compressive load, the underside of the covering is strongly pressed downward between the projections provided there (perhaps, until they come to rest on the floor). As a result, damage could occur in these thin areas of the spaces under continuous high stresses, in particular when there are alternating loads with relatively high frequency. Damage of this type, at first in the form of microcracks, enable dust and other dirt to penetrate into the material where they can act abrasively and even amplify the material-damaging effects of the high mechanical stress.

A floor covering (non-generic) is known from EP-A-0 800 358 in which the projections provided on the underside have overlapping areas with the projections on the upper side of the covering. As a result of an arrangement of this type, the occurrence of the aforementioned problems is avoided, however, the floor covering becomes substantially more rigid by necessity which means a clear deterioration in a crucial functional parameter.

Thus, the object of the invention is to provide an improved floor covering of the generic type which combines, in particular, very good cushioning properties with long durability even under high stress.

SUMMARY OF THE INVENTION

The invention comprises the essential idea of providing, in addition to the projections on the underside of the covering arranged without an overlapping area with the projections on the upper side, further projections which act as dynamic limiting means for pressing the covering down under high compressive loads. The height of these projections is less than the height of those projections on the underside of the floor covering on which it rests in an unstressed state, so that it does not start to act until a specific load (a preset pressure) is applied. They then increase, compared to a local load, with a characteristic line the rigidity of the covering, which can be adjusted via its height and shape as well as its grid size.

In a preferred embodiment, which is especially easy to clean and meets high requirements with respect to work safety and is esthetically pleasing, the first projections essentially have the shape of a spherical segment. In a further development of this embodiment, they are formed by a larger and a smaller spherical segment mounted on it. In this embodiment, the relative movement of the smaller spherical segment vis-à-vis the larger spherical segment produces an additional cushioning effect when loaded. Moreover, the more finely formed surface structure provides increased non-slip properties. These effects can also, moreover, be obtained in other combinations of a larger and a smaller basic moreover, be obtained in other combinations of a larger and a smaller basic geometric form, so that embodiments with basic geometric forms superimposed in this way can generally be considered advantageous.

In an advantageous embodiment, the second and/or third (additional) projections on the underside of the covering essentially have the form of flat prisms or frustums or even the form of a spherical segment, a flat truncated cone or a flat cylinder. In this case, it is especially advantageous if—in the interest of distinguished setting of the cushioning characteristics—different basic forms were selected for the second and third projections.

In view of the fact that the floor covering lies on the floor with the underside of the second projections (and perhaps also connected with it), an embodiment of the second projections having the top surface parallel to the plane of the covering is advantageous. Cutting and laying can be facilitated with an embodiment in which the second projections have straight lateral boundary edges, i.e. are formed, for example, almost like frustums or square prisms. A desirably progressive cushioning characteristic of the third projections results when they are configured as spherical segments or flat truncated cones whereby, in the latter case, the cushioning characteristic can be set, in addition to the dimensions, in particular also by selecting the angle of the cone.

In a currently preferred combination, the second projections are configured in the form of square prisms or frustums with rounded edges and rounded transitional areas to the plane of the covering and the third projections in the form of spherical segments.

The dimensions (diameter and/or edge measurements) of the second projections substantially correspond to the spaces between them in practical embodiments, while the dimensions of the third projections are clearly less than their distance from one another. In particular, they are less than ¾ of the respective distance, optionally also even considerably less.

Having regard to the fact that, in the proposed floor covering, there is no overlapping of the first and the second projections and the floor covering should nevertheless be supported adequately over the entire floor surface, the grid sizes of the arrangements of the first and second projections advantageously correspond. The grid size of the arrangement of the third projections can also correspond, however, it can also optionally be a multiple thereof. In the latter arrangement, a limiting projection on the underside would not be allocated to each projection on the upper side but, for example, only to every second or every third projection.

The proposed floor covering is preferably configured as a mat, in particular as an ergonomic mat for standing workplaces for almost all types of standing workplaces. In addition, it can be used as a safety device for high-grade industrial danger of falling. It is also useful for keeping animals or transporting animals. Its insulating action also makes its use in areas in which one could come in contact with live component parts and in which additional protection against grounding should be created. In addition to the embodiment as a defined mat, a wall-to-wall installation is also possible.

DETAILED DESCRIPTION OF THE PREFERRED EMBODIMENT

Figure 1A:
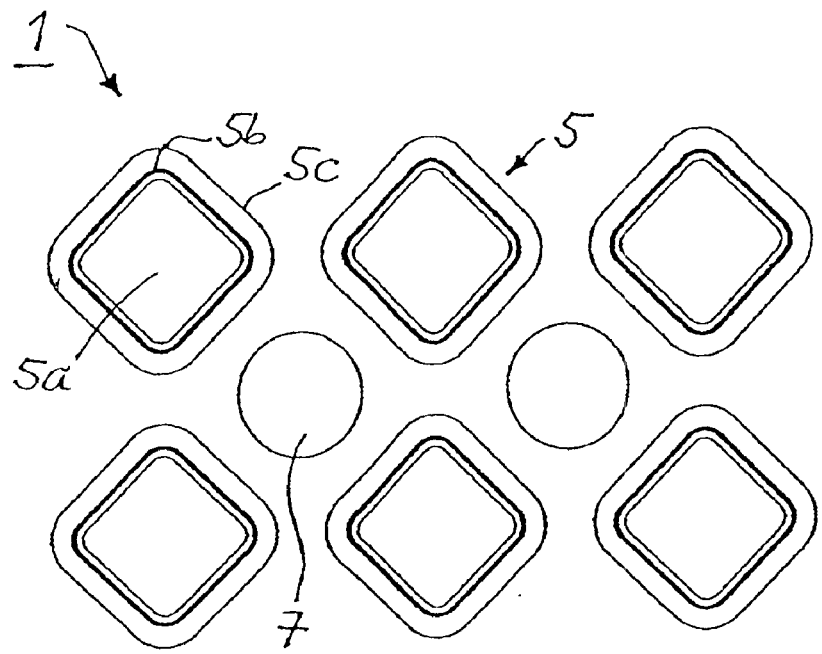
FIG. 1a shows a bottom view of the covering according to the present invention.

On the upper side 1a of the floor covering 1, it has first projections or elevations 3 whose form is composed of a first, larger spherical segment 3a and a second, substantially smaller spherical segment 3b, positioned on the highest point of the first spherical segment 3a. The height of the first spherical segment is about ⅕ to ¼ of its diameter on the covering plane. The height of the second spherical segment 3b is about ½ of the height of the first spherical segment 3a and the lateral extension of the second spherical segment corresponds to about ⅓ of that of the first spherical segment.

On the underside 1b of the floor covering 1, it carries first of all second projections or elevations 5 arranged in the interstices of the projections of the first projections 3 on the covering plane—i.e. essentially not overlapping with the first projections—and third projections 7 arranged between them and concentrically to the first projections 3 on the upper side 1a. (Only two of the third projections are shown in the drawings, however, it should be understood that a third projection 7 is allocated to each of the first projections 3 on the underside 1b of the floor covering.)

The second projections 5 have an end face 5a parallel to the covering plane and the form of square frustums with rounded edge areas 5b as well as rounded adjoining areas 5c to the underside of the covering 1b. The edge measurements of the second projections 5 are somewhat less than their distance from one another and are in the same order of magnitude as the lateral extension of the first projections 3 on the upper side 1a of the covering.

The third projections 7 have the shape of spherical segments and substantially smaller lateral dimensions than the first and second projections 3,5 as well as a height of about ⅔ of the height of the second projections 5. As a result, they only come in contact with the underlying floor when the floor covering 1 is considerably loaded locally on the first allocated projections 3 which bring about a substantial compression and deflection of the covering. In this case, they additionally support the covering in the area of the first projections 3 allocated in each case, i.e. due to their spherical-segmental shape with a progressive cushioning characteristic.

Figure 1B:
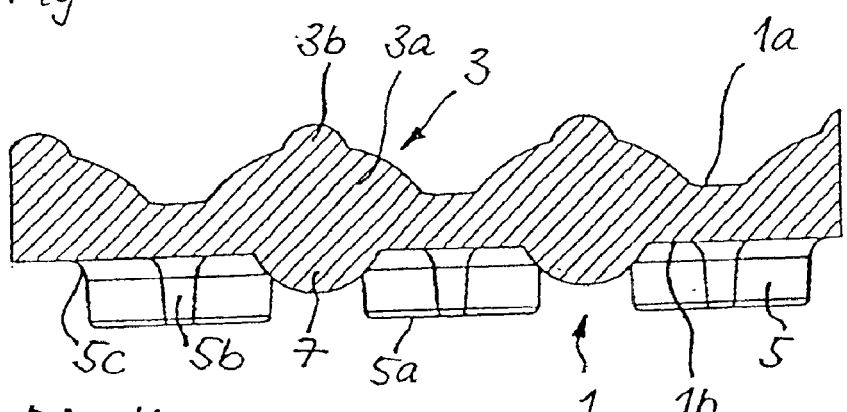
FIG. 1b shows a cross-sectional view of the covering.
Figure 2:
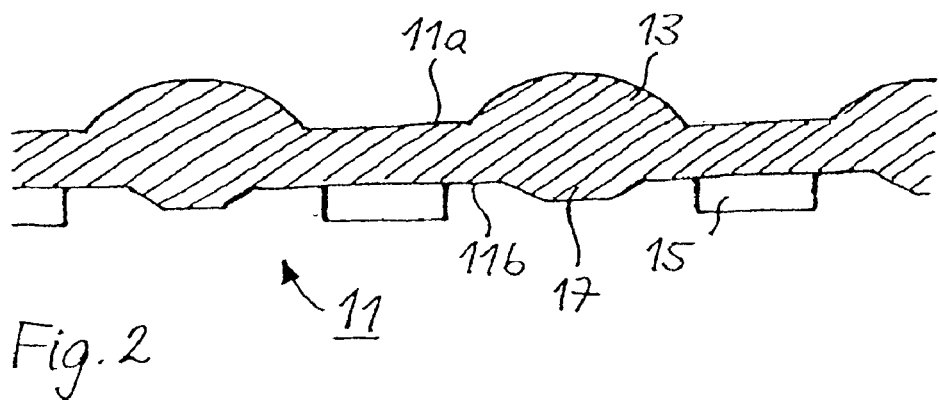
FIG. 2 shows a cross-sectional view of another embodiment of a floor covering according to the present invention.

FIG. 2 shows a further embodiment of a nitrile rubber floor covering 11 in a sectional representation, on the upper side 11a of which spherical segmental first projections 13 are provided at a distance which is clearly greater than the distance of the first projections 3 in the floor covering 1 according to FIGS. 1a and 1b and corresponds to about the lateral measurement of the projections 13 on the covering plane. Second projections 15 in the form of flat cylindrical knobs are provided on the underside 11b in the areas of the spaces between the projections of the first projections 13. The distance of the second projections from one another— relative to the lateral measurement—is substantially greater than in the second projections 5 according to FIGS. 1a and 1b. The floor covering 11 thus is less rigid than the floor covering of the first embodiment, provided that the material properties are the same.

Below the first projections 13, third projections 17 are arranged concentrically thereto and have the form of spherical segments in this case, and their lateral extension on the covering plane is less than that of the first projections 13 on the upper side 11a (the same as in the first embodiment).

Figure 3:
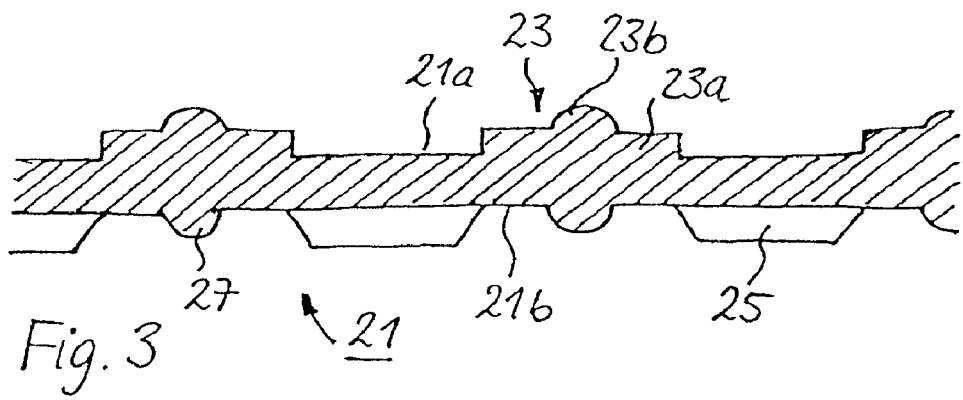
FIG. 3 shows a cross-sectional view of a still further embodiment of the floor covering according to the present invention.

In FIG. 3, a floor covering 21 is outlined in a sectional representation as a further embodiment of the invention, said floor covering 21 having first projections 23 on the upper side 21a which are composed of a flat cylindrical segment 23a and a spherical segment 23b mounted on them concentrically. Second projections 25 in the form of truncated cones are arranged in the interstices of the projections of the first projections 23 on the underside 21b of the covering 21. Third projections 27 are provided as dynamic forming limiters underneath the first projections 23, concentrically with their spherical segments 23b and having essentially the same measurements.

Figure 4:
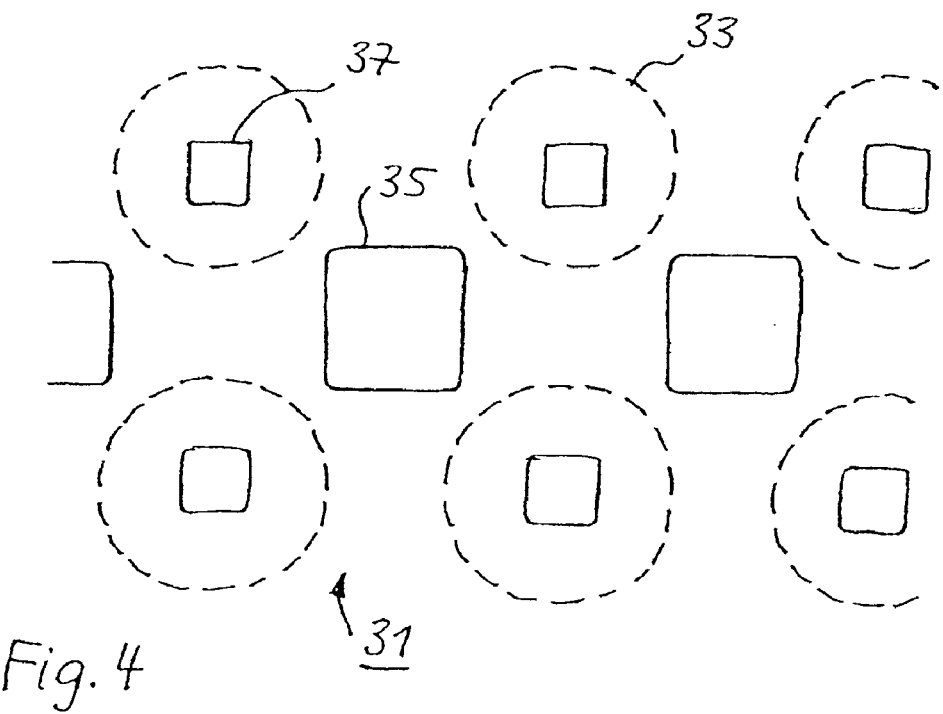
FIG. 4 shows a bottom view of yet further embodiment of a floor covering according to the present invention.

In FIG. 4, a further embodiment of the invention is shown in a view from the bottom of a further floor covering 31. On its upper side (shown by a broken line in the drawing), the covering has spherical-segmentally shaped first projections 33. Second projections 35 in the form of flat square prisms with rounded edges and corner areas are provided on the underside of the covering in the interstices between the first projections 33. Furthermore, third projections 37 are provided on the underside of the covering diagonally between these second projections 35 and aligned with the central axis of the first projections 33. In this case also, they have the shape of flat square prisms, but smaller lateral measurements and a slighter height of the second projections 35, so that they only touch the floor in the case of a load and, in addition, act as a cushion.

The scope of the invention is not limited to the examples described above, but a number of variations are also possible for one skilled in the art. In particular, the geometric shapes, measurements and grid sizes of the first, second and third projections can be combined and varied in numerous ways to adapt to the actual intended use and the load requirements of the floor covering as well as to obtain preset cushioning characteristics.

Figure 5:
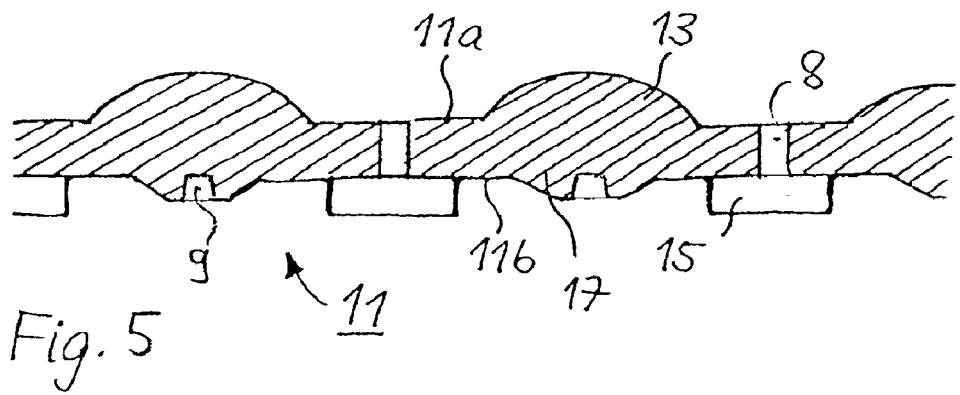
FIG. 5 shows a cross-sectional view of still further embodiment of the floor covering according to the present invention.

In a special further development of the basic idea of the invention, which can be seen with reference to FIG. 5, the floor covering has openings 8 (perforations) or rebounds 9 provided in the underside of the covering in which the thickness of the covering is reduced locally. A further distinguished setting of the elastic properties of the floor covering can be obtained, on the one hand, with these special embodiments and, especially in the case of perforations, the flow-off of water (or other liquid) that might have collected on the top of the covering. The additional perforations 8 or recesses 9 can be especially easily shown in circular form, however, they can also have an elongated form following the path of the interstices between the first and second projections of the floor covering. A form elongated in this way especially also comprises circular segments, however, it can also be closely adapted to the shape of the interstices.

What is claimed is:

1. A floor covering made of an elastically deformable material, comprising an upper side; an underside; first projections regularly arranged on the upper side; second projections regularly arranged on the underside for supporting the floor covering on a floor, the first and second projections having no overlapping regions in a plane of the floor covering; and third projections provided on the underside, arranged between the second projections, and having, in an unstressed state of the floor covering, a height smaller than a height of the second projections, whereby the third projections provide for an additional support of the floor covering on the floor when a load applied to the floor covering exceeds a predetermined value, wherein the third projections have a load dependent increasing characteristic line of rigidity whereby a progressive cushioning characteristic of the third projects is obtained.

2. A floor covering according to claim 1, wherein the first projections essentially have the shape of a spherical segment.

3. A floor covering according to claim 1, wherein at least one of the second and third projections have a shape of one of a flat square prism and a frustum.

4. A floor covering according to claim 1, wherein the first projections are formed by superimposition of two basic geometric forms including a larger spherical segment and a smaller spherical segment mounted on the larger spherical segment.

5. A floor covering according to claim 1, wherein at least one of the second and third projections have a shape of one of spherical segment, flat truncated cone, and flat cylinder.

6. A floor covering according to claim 3, wherein the second projections have the shape of the one of a square prism and a frustum with rounded edges and rounded areas adjoining underside of the covering and extending to a plane of the floor covering, and the third projections have the shape of a spherical segment.

7. A floor covering according to claim 1, wherein a distance between opposite edges of each of the second projections correspond to at least a distance between adjacent second projections.

8. A floor covering according to claim 1, wherein a distance between opposite edges of each of the third projections is less than a distance between adjacent third projections.

9. A floor covering according to claim 8, wherein the distance between the opposite edges each of third projections is less than ¾ of the distance between the adjacent third projections.

10. A floor covering according to claim 1, wherein grid sizes of arrangements of the first and second projections essentially correspond, and a grid size of the third projections corresponds to the grid size of the arrangements of the first and second projections or a multiple thereof.

11. A floor covering according to claim 1, wherein a height of the first projections is less than ⅓ of a largest dimension thereof in a covering plane and a height of at least one of a second and third projections is in a range of between ⅕ and ½ of a dimension thereof in a plane of the floor covering.

12. A floor covering according to claim 1, further comprising at least one of perforations provided between the first and second projections and recesses formed in the underside.

13. A floor covering according to claim 1, wherein at least one of the perforations and the recesses have one of a circular cross-section and a cross-section of a segment.

* * * * *